(12) United States Patent
Hinoshita et al.

(10) Patent No.: US 8,872,031 B2
(45) Date of Patent: Oct. 28, 2014

(54) TWISTED PAIR WIRE AND TWISTED PAIR CABLE USING STRANDED CONDUCTORS HAVING MOISTURE RESISTANCE

(75) Inventors: Shinji Hinoshita, Hitachi (JP); Yuki Koda, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 28 days.

(21) Appl. No.: 13/444,307

(22) Filed: Apr. 11, 2012

(65) Prior Publication Data

US 2012/0298400 A1    Nov. 29, 2012

(30) Foreign Application Priority Data

May 25, 2011    (JP) .................................. 2011-116850

(51) Int. Cl.
*H01B 11/02* (2006.01)
*H01B 7/29* (2006.01)

(52) U.S. Cl.
CPC ....................................... *H01B 7/29* (2013.01)
USPC ................... 174/113 R; 174/110 R; 174/68.1

(58) Field of Classification Search
USPC ....................... 174/24, 27, 68.1, 110 R, 113 R
See application file for complete search history.

(56) References Cited

U.S. PATENT DOCUMENTS

| 5,453,322 | A | * | 9/1995 | Keogh et al. .................. 428/379 |
| 5,502,288 | A | * | 3/1996 | Cogen et al. .............. 174/113 R |
| 5,597,981 | A | * | 1/1997 | Hinoshita et al. ......... 174/110 R |
| 5,670,748 | A | * | 9/1997 | Gingue et al. ............. 174/120 R |
| 5,981,065 | A | * | 11/1999 | Keogh et al. .................. 428/379 |
| 6,339,189 | B1 | * | 1/2002 | Caimi .............................. 174/36 |
| 7,265,296 | B2 | * | 9/2007 | Jow et al. .................. 174/110 R |
| 7,667,139 | B2 | * | 2/2010 | Nakayama et al. ..... 174/110 SR |
| 8,344,262 | B2 | * | 1/2013 | Tamiya et al. ................. 174/258 |
| 8,420,939 | B2 | * | 4/2013 | Hernandez-Hernandez et al. .......................... 174/120 R |
| 2008/0311328 | A1 | | 12/2008 | Kimura |
| 2011/0220390 | A1 | * | 9/2011 | Szylakowski et al. .... 174/113 R |

FOREIGN PATENT DOCUMENTS

| JP | 2001-006452 A | 1/2001 |
| JP | 2001-256835 | 9/2001 |

OTHER PUBLICATIONS

JP Office Action dated May 7, 2014 and English translation of the Notification of Reasons for Refusal.

* cited by examiner

*Primary Examiner* — Angel R Estrada
*Assistant Examiner* — Dimary Lopez Cruz
(74) *Attorney, Agent, or Firm* — Roberts Mlotkowski Safran & Cole P.C.

(57) ABSTRACT

A twisted pair wire includes a pair of covered wires each formed by covering stranded conductors with a covering body. The covering body includes a covering body material including a silane coupling agent. Alternatively, the covering body includes a plurality of covering layers, and an innermost layer of the plurality of covering layers contacting with the stranded conductors includes a covering body material including a silane coupling agent.

8 Claims, 5 Drawing Sheets

PRIOR ART

TWISTED PAIR WIRE AND TWISTED PAIR CABLE USING STRANDED CONDUCTORS HAVING MOISTURE RESISTANCE

The present application is based on Japanese patent application No. 2011-116850 filed on May 25, 2011, the entire contents of which are incorporated herein by reference.

BACKGROUND OF THE INVENTION

1. Field of the Invention

The invention relates to a twisted pair wire and a twisted pair cable for use in a high-frequency range, such as for a LAN (local area network) or differential signals, etc.

2. Description of the Related Art

It is prohibited to use a stranded conductor for a major part of a LAN cable (90 m of 100 m-link). This is because humidity (moisture) enters into a gap between strands of the stranded conductor (hereinafter, referred to as clearance space) during long-term use, which increases high-frequency resistance and leakage conductance and then increases transmission loss/attenuation (hereinafter, referred to as attenuation).

On the other hand, a stranded conductor is used for a short link such as a working LAN cable for the industrial purpose since flexibility thereof makes laying easy and allows use in vibrating equipments. However, transmission loss increases during long-term use in case of being used for a relatively long distance, which causes failure such as system error or deterioration in data BER (bit error rate).

FIG. 7 is a cross sectional view showing a conventional twisted pair cable using a stranded conductor which is used for a short link.

A twisted pair cable 70 has a stranded conductor 13 formed by twisting seven strands 12 together in a 6-around-1 configuration (a strand 12 located in the middle is surrounded by six helically twisted strands 12). The stranded conductor 13 is covered with a covering body 33 to form a covered strand 72 and a twisted pair wire 71 formed by twisting a pair of the covered strands 72 is further covered with a bundling covering body 16, thereby forming the twisted pair cable 70.

The related art of the invention may be disclosed in JP-A-2001-6452.

In order to manufacture a stranded conductor, it is necessary to twist strands. If strands are not twisted, it is only a bunch of strands and the strands are tangled with each other when wound around a bobbin, hence, it is not possible to manufacture.

On a stranded conductor formed by twisting strands (strand diameter d) at a twist angle A, contact surfaces between strands are present in a length direction of the stranded conductor at a pitch of distance-$L=d/\cos A$ as shown in FIG. 8. Therefore, equivalent volume resistivity (high-frequency resistance) as the stranded conductor is not volume resistivity of the conductor per se but resistivity of volume composed of the conductor (major portion), contact surface between the strands and the clearance space therebetween.

Here, relations among attenuation ($\alpha$), resistance attenuation ($\alpha_R$), leakage attenuation ($\alpha_g$), equivalent volume resistivity ($\rho$) and dielectric tangent ($\tan \delta$) of the stranded conductor are represented by the following formulas (1) to (3), where an equivalent skin thickness on which high-frequency current alternately propagates is t, a diameter of the stranded conductor is D, frequency is f, characteristic impedance of the pair is $Z_c$, mutual capacitance of the pair is C and leakage conductance is $G=2\pi fC \tan \delta$.

$$\alpha = \alpha_R + \alpha_g \quad (1)$$

$$\alpha_R = 2\rho/(\pi Dt)/(2Z_c) \quad (2)$$

$$\alpha_g = GZ_c/2 \quad (3)$$

When a stranded conductor is used for a long period of time, moisture enters into a gap between strands and metal is corroded. Accordingly, irregularity is formed surface of the strand due to the corrosion, which results in that the strands are not in surface contact but in point contact with each other. As a result, contact resistance increases by a factor of 1.3 to several times. Furthermore, when the twist angle A is small, the distance L also becomes small and frequency of clearance space in a length direction of the stranded conductor (frequency of contact between strands) is increased, influence of the increase in the contact resistance is thus augmented and the equivalent volume resistivity $\rho$ (high-frequency resistance) is increased more than 10 times. This increases the resistance attenuation of the entire attenuation and becomes a main cause of failure. In addition, when the humidity in the clearance space is increased, $\tan \delta$ (leakage conductance G) deteriorates since an electric field between conductors also includes the clearance space, which increases leakage attenuation of the entire attenuation and becomes a sub cause of failure.

SUMMARY OF THE INVENTION

Accordingly, it is an object of the invention to provide a twisted pair wire and a twisted pair cable using stranded conductors that an attenuation due to moisture can be suppressed.

(1) According to one embodiment of the invention, a twisted pair wire comprises:

a pair of covered wires each formed by covering stranded conductors with a covering body, wherein the covering body comprises a covering body material including a silane coupling agent.

(2) According to another embodiment of the invention, a twisted pair wire comprises:

a pair of covered wires each formed by covering stranded conductors with a covering body, wherein the covering body comprises a plurality of covering layers, and an innermost layer of the plurality of covering layers contacting with the stranded conductors comprises a covering body material including a silane coupling agent.

In the above embodiment (1) or (2) of the invention, the following modifications and changes can be made.

(i) The silane coupling agent is included in the covering body material at a compounding ratio of not less than 0.5% by mass and not more than 2.0% by mass.

(3) According to another embodiment of the invention, a twisted pair wire comprises:

a pair of covered wires each formed by covering stranded conductors with a covering body, wherein the pair of covered wires each comprise a silane coupling agent applied to the stranded conductors and the covering body covering the applied silane coupling agent.

(4) According to another embodiment of the invention, a twisted pair cable comprises:

at least one twisted pair wire according to one of the embodiments (1) to (3); and a bundling covering body covering the twisted pair wire and including a flame retardant.

Points of the Invention

According to one embodiment of the invention, a twisted pair wire is constructed such that a covering body for covering stranded conductors comprises a covering body material containing a silane coupling agent. Thereby, when moisture (humidity) penetrates between the stranded conductor and the covering body, the adhesion therebetween can be improved due to silane or silanol bond therebetween formed by the penetrated moisture, so that further entrance of the moisture can be blocked to suppress an increase in contact resistance due to the corrosion of metal.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

The inventors discovered that, when a several % by mass of silane coupling agent is contained in a covering body or when a covered strand is formed by applying a silane coupling agent to a surface of a stranded conductor and subsequently covering with a covering body, a silane bond or silanol bond is formed between a hydroxide polymer group (covering body) and metal such as copper (stranded conductor) by moisture penetrating through the covering body, which blocks further entrance of moisture and thus prevents corrosion of metal surface in a clearance space and an increase in equivalent volume resistivity. At the same time, it was found that tan δ is not increased since humidity in the clearance space is not increased, which results in that it is possible to prevent resistance attenuation and leakage attenuation from increasing, and the present invention was thereby achieved.

That is, the invention is characterized in that a twisted pair wire is formed by twisting a pair of covered strands each formed by covering a stranded conductor with a covering body, wherein the covered body for covering the stranded conductor is formed of a covering body material containing a silane coupling agent or the stranded conductor having a silane coupling agent applied thereto is covered with a covering body.

Preferred embodiments of the invention will be described below in reference to the drawings.

Figure 1:
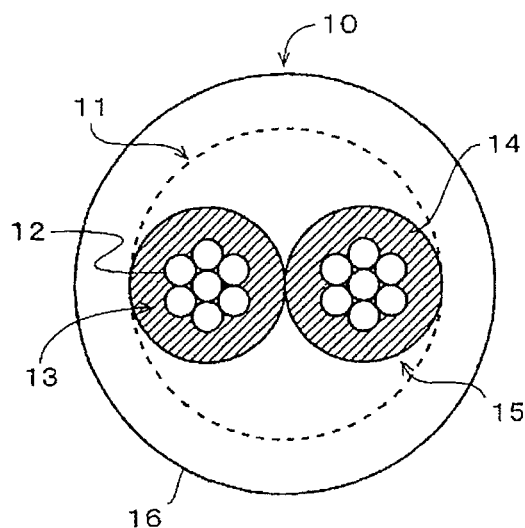
FIG. 1 is a cross sectional view showing a structure of a twisted pair cable in a first embodiment of the present invention.

FIG. 1 is a cross sectional view showing a structure of a twisted pair cable using a twisted pair wire in a first embodiment.

As shown in FIG. 1, a stranded conductor 13 is formed by twisting seven strands 12 in a 6-around-1 configuration and a pair of covered strands 15 each formed by covering the stranded conductor 13 with a covering body 14 is twisted together, thereby forming a twisted pair wire 11 of the present embodiment.

For the strand 12, it is possible to use a general good conductor such as pure copper or copper alloy, or pure aluminum or aluminum alloy. The dimension of the strand 12 is not specifically limited, and can be, e.g., about ϕ0.2 mm in diameter.

In addition, for the stranded conductor 13, the number of strands 12 and a twist angle, etc., are not specifically limited and can be changed according to use environment (vibration and bending, etc.) of the twisted pair wire 11.

The covering body 14 is formed of a covering body material which is a general insulating resin containing a silane coupling agent.

As the insulating resin used for a covering body material, it is possible to use, e.g., polyethylene (very low-density polyethylene, low-density polyethylene, medium density polyethylene and high-density polyethylene, etc.).

Meanwhile, the silane coupling agents used for the covering body material include vinylsilane, acryloxysilane, mercaptosilane, aminosilane and epoxysilane, etc.

A compounding ratio of the silane coupling agent in the covering body material should be not less than 0.5% by mass and not more than 2.0% by mass. Considering a bond with the stranded conductor, the compounding ratio of 0.5% by mass is sufficient. When the compounding ratio is less than 0.5% by mass, a below-described effect of blocking entrance of humidity is insufficient due to lack of bonds with stranded conductor and it is not possible to suppress an increase in attenuation. On the other hand, when the compounding ratio is more than 2.0% by mass, plastic characteristics (tensile characteristics, etc.) of the covering body are impaired and also an excess compounding agent migrates, which makes the material unsuitable as an insulating covering.

A twisted pair cable 10 is formed by jacketing at least one twisted pair wire 11 with the bundling covering body 16.

For flame-retarding the a twisted pair cable, a flame retardant-containing bundling covering body in which a flame retardant such as magnesium hydroxide is mixed with, e.g., a sheath material formed of polyvinyl chloride (PVC) can be used as the bundling covering body 16. This is because, when a flame retardant formed of metal oxide is mixed in the covering body 14 covering the stranded conductor 13, tan δ of the metal oxide is poor and transmission loss of the twisted pair wire increases due to high frequency. It should be noted that the configuration of the flame retardant-containing bundling covering body is not specifically limited in the invention, and it is possible to use various sheath materials and flame retardants and flame retardancy can be obtained while maintaining high frequency characteristics.

The twisted pair wire 11 or the twisted pair cable 10 configured as described above is effective especially for high frequency transmission at not less than 100 MHz.

Effects of the present embodiment will be described below.

In the twisted pair wire of the present embodiment, the covering body for covering the stranded conductor is comprised of a covering body material containing a silane coupling agent. Thereby, when moisture (humidity) penetrates between the stranded conductor and the covering body, the adhesion therebetween can be improved due to silane or silanol bond therebetween formed by the penetrated moisture, so that further entrance of the moisture can be blocked to suppress an increase in contact resistance due to the corrosion of metal.

At the same time, deterioration of tan δ caused by the entrance of moisture can be suppressed and it is possible to suppress an increase in leakage resistance. Therefore, sufficient moisture resistance is exhibited.

In addition, in the twisted pair cable of the present embodiment, use of a twisted pair wire having moisture resistance allows an increase in attenuation to be suppressed even if moisture enters through the bundling covering body (sheath material), and it is thus possible to add a desired amount of flame retardant to the bundling covering body.

Next, the second embodiment will be described in reference to FIG. 2.

In the invention, a silane coupling agent is used for silane or silanol bond formation between the stranded conductor and the covering body, thereby suppressing entrance of moisture between the stranded conductor and the covering body.

Figure 2:
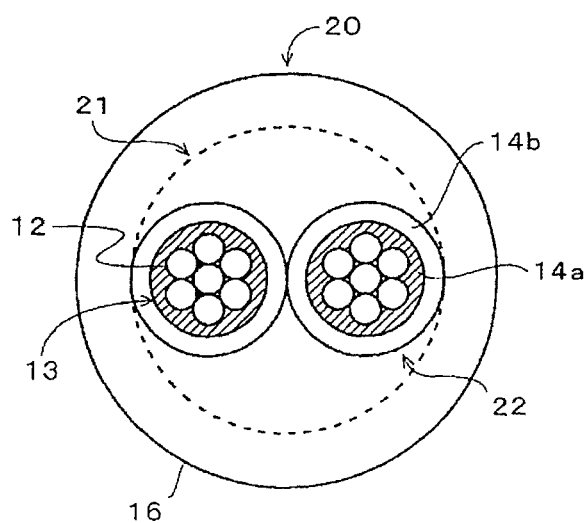
FIG. 2 is a cross sectional view showing a structure of a twisted pair cable in a second embodiment of the invention.

Therefore, there is no need that the silane coupling agent is contained in the overall thickness of the covering body and, as shown in FIG. 2, a covered strand 22 may be formed by covering the stranded conductor 13 with two covering bodies 14a and 14b such that, of the two covering bodies 14a and 14b, the inner covering body 14a in contact with the stranded conductor 13 is formed of a covering body material containing a silane coupling agent. This allows silane or silanol bond formation between the stranded conductor 13 and the inner covering body 14a and it is thereby possible to obtain moisture resistance.

A twisted pair wire 21 and a twisted pair cable 20 also achieve the same effects as the first embodiment.

In addition, in the twisted pair wire 21, since only the inner covering body 14a which is in contact with the stranded conductor 13 is formed of the covering body material containing a silane coupling agent, deterioration of plastic characteristics of the covering body material caused by mixing the silane coupling agent does not occur in the outer covering body 14b, which allows the twisted pair wire 21 to have better characteristics.

Figure 3:
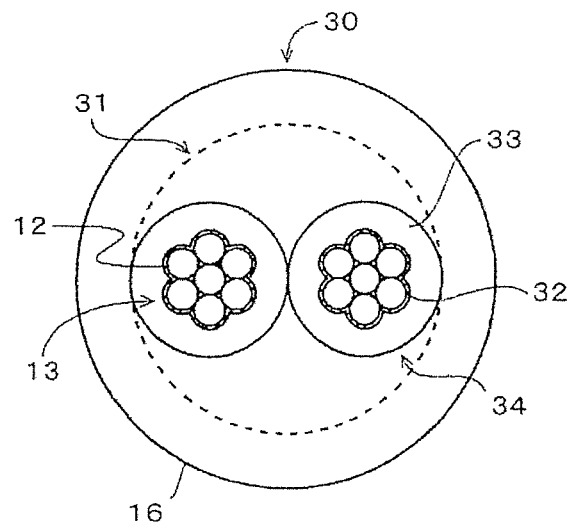
FIG. 3 is a cross sectional view showing a structure of a twisted pair cable in a third embodiment of the invention.

Alternatively, in the invention, a covered strand 34 may be formed by applying a silane coupling agent 32 to the stranded conductor 13 and subsequently covering with a covering body 33 (not containing a silane coupling agent) as shown in FIG. 3.

In a twisted pair wire 31 and a twisted pair cable 30, it is possible to obtain the same effects as the first and second embodiments only by applying the silane coupling agent 32 to the surface of the stranded conductor 13 and it is possible to manufacture more easily.

According to the invention as described above, it is possible to provide a twisted pair wire applicable to an industrial LAN cable used for relatively long distance and to high-frequency balanced (differential) signal transmission in a vehicle with large vibration even though the stranded conductor is used. The twisted pair wire and the twisted pair cable of the invention are especially effective as a high-frequency transmission cable for not less than 100 MHz.

It should be noted that the present invention is not intended to be limited to the above-mentioned embodiments, and the various kinds of changes can be made.

EXAMPLES

Examples of the invention will be described below.

Figure 7:
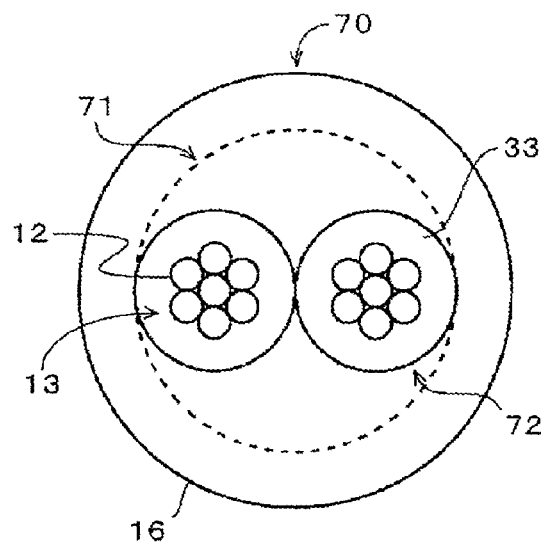
FIG. 7 is a cross sectional view showing a structure of a conventional twisted pair cable.
Figure 8:
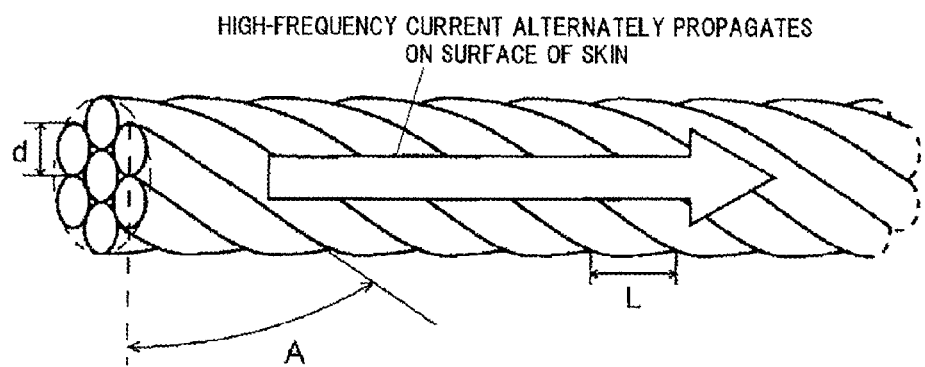
FIG. 8 is a schematic explanatory diagram illustrating a relation between a twist angle A and a pitch L of the stranded conductor.

A twisted pair cable in the first embodiment of the invention (FIG. 1: hereinafter, referred to as the product of the invention) and a conventional twisted pair cable (FIG. 7: hereinafter, referred to as the conventional product) were made as follows.

Two 0.565 mm-diameter stranded conductors, each formed by twisting seven 0.208 mm-diameter copper strands at a twist angle of 75° in a 6-around-1 configuration, were made.

For the product of the invention, the stranded conductor was extrusion-covered with a covering body material in which 1% by mass of vinylsilane coupling agent is mixed in a low-density polyethylene for insulating covering (hereinafter, referred to as PE), thereby making a 0.97 mm-diameter covered strand. On the other hand, for the conventional product, the stranded conductor was extrusion-covered with PE, thereby making a 0.97 mm-diameter covered strand.

Each pair of covered strands was twisted together at a certain degree of twisting to finish a 1.94 mm-diameter twisted pair wire. The twisted pair wire was jacketed with a PVC sheath, thereby finishing a 2.74 mm-diameter twisted pair cable.

In order to demonstrate the effects of the invention, an accelerated deterioration test was conducted on each of the obtained twisted pair cables at 85° C. and a relative humidity of 85% for 30 days. The accelerated deterioration test was conducted on the assumption of accelerating load of 25 to 30 years under conditions generally applied to communication devices.

Figure 4:
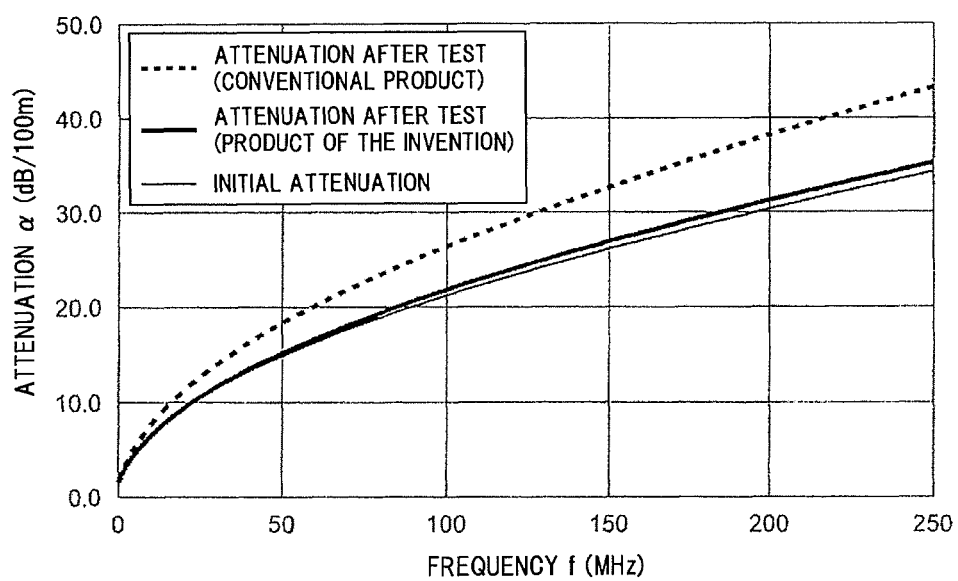
FIG. 4 is a graph showing variation in attenuation of a twisted pair cable of the invention and a conventional twisted pair cable before and after an accelerated deterioration test.

FIG. 4 shows results of measuring and comparing initial attenuation and attenuation after the accelerated deterioration test of the product of the invention and those of the conventional product. In this regard, the initial attenuation of the product of the invention was the same as that of the conventional product.

FIG. 4 shows that the invention is effective to suppress an increase in attenuation after the accelerated deterioration test (equivalent to 25 to 30 year-lifetime). With concrete numerical values (raw data), the attenuation at a frequency of 100 MHz (initially 21.5 dB/100 m) was 26.9 dB/100 m in the conventional product (25% increase from the initial stage) and was 21.9 dB/100 m in the product of the invention (1.9% increase from the initial stage), which demonstrates that it is possible to sufficiently suppress deterioration in the invention. This demonstrates that the silane bond formation between the covering body and copper by the silane coupling agent prevents moisture from entering a clearance space.

Next, resistance attenuation and leakage attenuation were evaluated as follows based on each curved line of the attenuation obtained in FIG. 4.

Attenuation ($\alpha$) is divided into resistance attenuation ($\alpha_R$) and leakage attenuation ($\alpha_g$) according to the following formulas (4) and (5).

$$\alpha = \alpha_R + \alpha_g = A\sqrt{f} + Bf \quad (4)$$

$$(\alpha_R = A\sqrt{f}, \alpha_g = Bf)$$

$$\alpha/\sqrt{f} = A + B\sqrt{f} \quad (5)$$

By calculating the formula (5), the term A is obtained as a term of resistance attenuation and the term B is obtained as a term of leakage attenuation are obtained.

In FIG. 4, the attenuation ($\alpha$) is in a transition region up to 56 MHz and the formula (5) cannot be linearly interpolated. Therefore, the formula (5) was calculated using data at not less than 56 MHz, and the data at not less than 56 MHz and not more than 225 MHz was linearly interpolated to derive an interpolation formula. The results are shown in FIG. 5.

Figure 5:
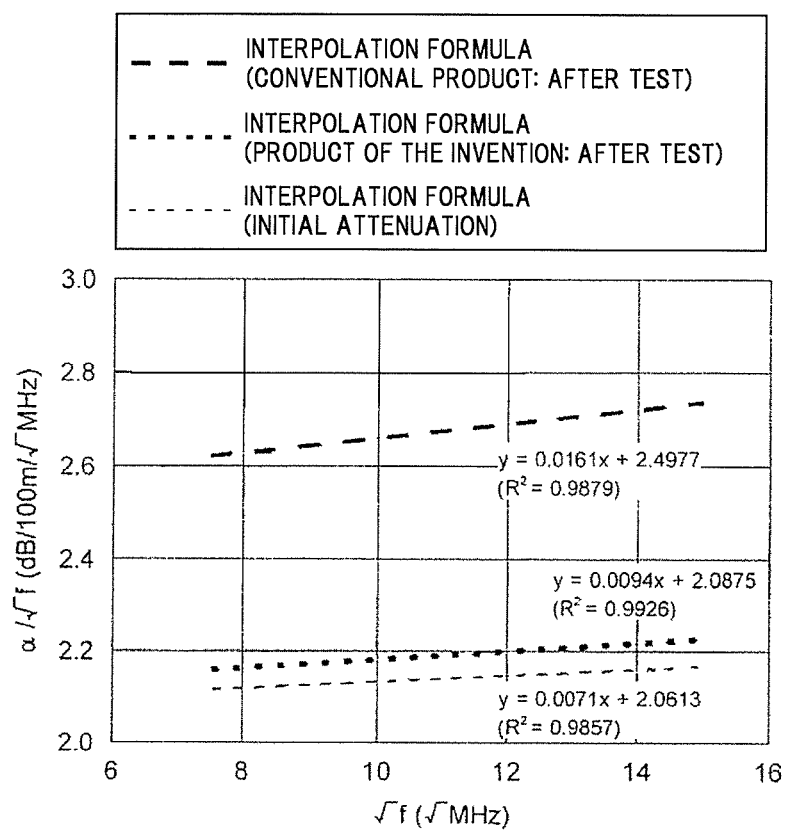
FIG. 5 is a graph showing variations in resistance attenuation and leakage attenuation of the twisted pair cable of the invention and the conventional twisted pair cable before and after an accelerated deterioration test.

In addition, the attenuation ($\alpha$), the resistance attenuation ($\alpha_R$) and the leakage attenuation ($\alpha_g$) at a frequency-f of 100 MHz were respectively derived by the interpolation formulas shown in FIG. 5. The derived numerical values are shown in Table 1.

TABLE 1

| Items | Initial data Conventional product (FIG. 7) and Product of the invention (FIG. 1) | After accelerated deterioration test | |
|---|---|---|---|
| | | Conventional product (FIG. 7) | Product of the invention (FIG. 1) |
| Attenuation α (dB/100 m) | 21.32 (100%) | 26.59 (125%) | 21.82 (102%) |
| Resistance attenuation $α_R$ (dB/100 m) | 20.61 (100%) | 24.98 (121%) | 20.88 (101%) |
| Leakage attenuation $α_g$ (dB/100 m) | 0.71 (100%) | 1.61 (226%) | 0.94 (133%) |

(*at a frequency-f of 100 MHz)

The following is a method of calculating the numerical value.

The formula (5) corresponds to the interpolation formula shown in FIG. 5. In other words, the relation is $α/\sqrt{f}=y=A+B\sqrt{f}$, where A is a constant term in the interpolation formula, B is proportionality factor of x in the interpolation formula and $\sqrt{f}$ is x. Each numerical value shown in Table 1 can be derived from this relation and the formula (4).

FIG. 5 and Table 1 demonstrate that deterioration at a frequency of 100 MHz can be suppressed in the product of the invention such that the resistance attenuation ($α_R$) is suppressed from 121% of the conventional product to 101% and the leakage attenuation ($α_g$) is suppressed from 226% of the conventional product to 133%.

Next, for the product of the invention, covered strands were made of covering body materials containing a vinylsilane coupling agent at different compounding ratios varied from 0 to 2.5% by mass and it was evaluated how the compounding ratio of the silane coupling agent in the covering body material affects a force of pulling out the copper conductor from the covering body and elongation at break of the covering body. Note that, the force of pulling out the copper conductor from the covering body indicates level of silane bond and silanol bond between the stranded conductor and the covering body.

Figure 6:
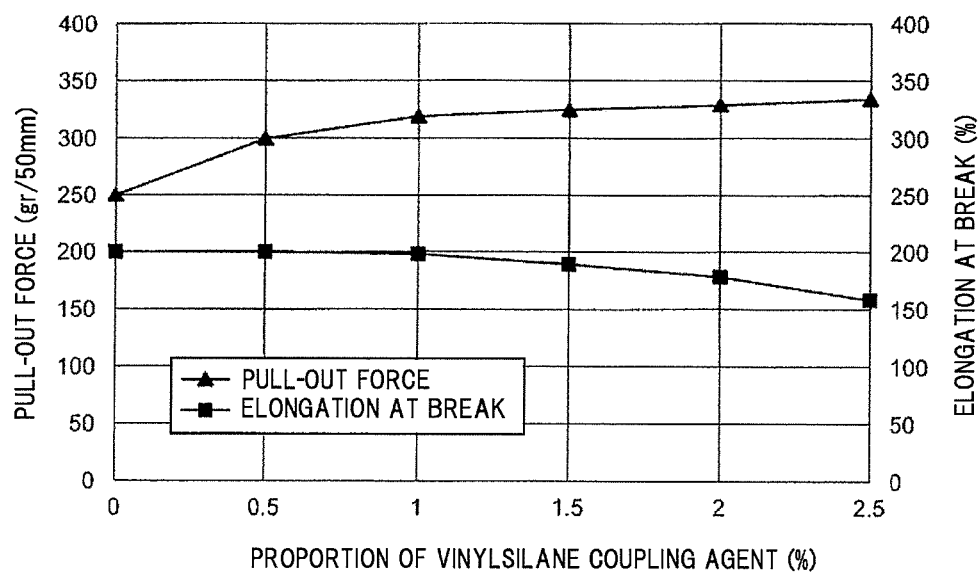
FIG. 6 is a graph showing relations among a proportion of vinylsilane coupling agent, a force of pulling out a covered wire and an elongation at break of a covering body.

FIG. 6 shows test results of a force of pulling copper conductor 50 mm out from the covering body and elongation at break of the covering body per se.

From FIG. 6, it is understood that the same effect as the case of containing 1.0% by mass of silane coupling agent is obtained at the compounding ratio of 0.5% by mass. This is because 0.5% by mass of silane coupling agent provides enough bonds with copper. On the other hand, it is understood that more than 2.0% by mass of silane coupling agent impairs plastic characteristics of the covering body and causes migration of the excess compounding agent, hence, it is not suitable as insulating covering.

The above data revealed that the optimum compounding ratio as a whole is 1%, which provides the saturated force of pulling out the copper conductor from the covering body and a region in which the elongation at break of the covering body does not rapidly deteriorate.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A twisted pair wire, comprising:
    a pair of covered wires each formed by directly covering stranded conductors with a covering body,
    wherein the covering body comprises a covering body material containing a moisture activatable silane coupling agent,
    wherein upon exposure to moisture, the stranded conductors and the covering body become bonded to each other by a moisture-blocking silane bond or silanol bond.

2. The twisted pair wire according to claim 1, wherein the silane coupling agent is included in the covering body material at a compounding ratio of not less than 0.5% by mass and not more than 2.0% by mass.

3. A twisted pair cable, comprising:
    at least one twisted pair wire according to claim 1; and
    a bundling covering body covering the twisted pair wire and including a flame retardant.

4. A twisted pair wire, comprising:
    a pair of covered wires each formed by directly covering stranded conductors with a covering body,
    wherein the covering body comprises a plurality of covering layers, and an innermost layer of the plurality of covering layers contacting with the stranded conductors comprises a covering body material containing a moisture activatable silane coupling agent,
    wherein upon exposure to moisture, the stranded conductors and the covering body become bonded to each other by a moisture-blocking silane bond or silanol bond.

5. The twisted pair wire according to claim 4, wherein the silane coupling agent is included in the covering body material at a compounding ratio of not less than 0.5% by mass and not more than 2.0% by mass.

6. A twisted pair cable, comprising:
    at least one twisted pair wire according to claim 4; and
    a bundling covering body covering the twisted pair wire and including a flame retardant.

7. A twisted pair wire, comprising:
    a pair of covered wires each formed by covering stranded conductors with a covering body,
    wherein the pair of covered wires each comprise a moisture activatable silane coupling agent directly applied to the stranded conductors and the covering body covering the applied silane coupling agent,
    wherein upon exposure to moisture, the stranded conductors and the covering body become bonded to each other by a moisture-blocking silane bond or silanol bond.

8. A twisted pair cable, comprising:
    at least one twisted pair wire according to claim 7; and
    a bundling covering body covering the twisted pair wire and including a flame retardant.

* * * * *